United States Patent
Fox

(10) Patent No.: US 6,387,435 B1
(45) Date of Patent: *May 14, 2002

(54) METHOD OF PROCESSING MULTIPLE WHOLE GRAIN MIXTURES AND PRODUCTS THEREFROM

(76) Inventor: Joseph R. Fox, 1425 9th Ave. SW P.O. Box 1296, Watertown, SD (US) 57201

( * ) Notice: Subject to any disclaimer, the term of this patent is extended or adjusted under 35 U.S.C. 154(b) by 0 days.

This patent is subject to a terminal disclaimer.

(21) Appl. No.: 09/614,023

(22) Filed: Jul. 11, 2000

Related U.S. Application Data

(63) Continuation-in-part of application No. 09/281,666, filed on Mar. 30, 1999, now Pat. No. 6,287,626, which is a continuation-in-part of application No. 08/948,434, filed on Oct. 10, 1997, now abandoned.

(51) Int. Cl.⁷ .............................................. A23L 1/172
(52) U.S. Cl. ................... 426/615; 426/455; 426/456; 426/459; 426/506; 426/507; 426/618
(58) Field of Search .................. 426/455, 456, 426/459, 615, 618, 506, 507

(56) References Cited

U.S. PATENT DOCUMENTS

| | | |
|---|---|---|
| 2,884,327 A | 4/1959 | Robbins |
| 2,930,697 A | 3/1960 | Miller |
| 3,162,535 A | 12/1964 | Ferrel |
| 3,190,754 A | 6/1965 | Mathews |
| 3,228,771 A | 1/1966 | Copley et al. |
| 3,264,113 A | 8/1966 | Barta et al. |
| 3,457,084 A | 7/1969 | Weiss |
| 3,526,511 A | 9/1970 | Rockland |
| 3,778,521 A | 12/1973 | Fisher et al. |
| 3,851,085 A | 11/1974 | Rodgers et al. |
| 4,282,319 A | 8/1981 | Conrad |
| 4,361,593 A | 11/1982 | Brooks et al. |
| 4,377,602 A | 3/1983 | Conrad |
| 4,413,018 A | 11/1983 | Webster |
| 5,089,281 A | 2/1992 | Baz et al. |
| 5,240,728 A | 8/1993 | Grenet et al. |
| RE34,508 E | 1/1994 | Murtaugh et al. |
| 5,334,407 A | 8/1994 | Donnelly et al. |
| 5,350,585 A | 9/1994 | Sunderland |
| 5,409,729 A | 4/1995 | Friesen |
| 5,410,951 A | 5/1995 | Ledet et al. |
| 5,427,809 A | 6/1995 | Donnely |
| 5,447,742 A | 9/1995 | Malvido et al. |
| 5,464,647 A | 11/1995 | Messick |
| 5,498,435 A | 3/1996 | Hosoda et al. |
| 5,516,048 A | 5/1996 | Falk |
| 5,520,949 A | 5/1996 | Lewis et al. |
| 6,287,626 B1 * | 9/2001 | Fox ........................ 426/615 |

OTHER PUBLICATIONS

The Wholefood Catalog, P. 9–10, 1988.*

* cited by examiner

*Primary Examiner*—Lien Tran
(74) *Attorney, Agent, or Firm*—McKee, Voorhees & Sease, P.L.C.

(57) ABSTRACT

A waxy hull-less barley product is described having a moisture content of from 50–75%. The product is prepared by cooking the grains in water for 15–120 minutes at a temperature of 75–150° C. Next, the grains are rinsed with cool water to remove excess starch and stop the cooking process. The grains are then either dried or flash frozen to form a free-flowing product which may be directly eaten, rehydrated in 1–7 minutes in the case of dried grains, or reheated in 1–7 minutes in the case of flash frozen grains. Food products manufactured from the processed waxy hull-less barley are also disclosed.

12 Claims, No Drawings

METHOD OF PROCESSING MULTIPLE WHOLE GRAIN MIXTURES AND PRODUCTS THEREFROM

CROSS-REFERENCE TO RELATED APPLICATIONS

This application is a continuation-in-part of application Ser. No. 09/281,666 filed Mar. 30, 1999 now U.S. Pat. No. 6,287,626, which is a continuation-in-part of application Ser. No. 08/948,434 filed Oct. 10, 1997 now abandoned.

FIELD OF THE INVENTION

The present invention relates to a novel process for preparing a food product suitable for human consumption from whole grains. The food product may comprise a single grain or a blend of whole grains. The grains may be whole kernel or milled.

BACKGROUND OF THE INVENTION

The primary source of complex carbohydrates for populations of the earth is from grains. World coarse grain consumption is predicted to increase by 1.5% annually during the next 10 years to reach 980.5 million tons, according to the latest demand forecast issued by the U.S. Feed Grains Council on Feb. 4, 1997. While there are other important starchy carbohydrate sources, such as potatoes, cassava, and sweet potatoes, grains are pre-eminent in providing starchy carbohydrate energy for the world's population. One reason is that grains are harvested in a naturally dry state and hence are relatively non-perishable. By contrast, potatoes, cassava, and sweet potatoes, for example, are harvested at an elevated moisture content and because of this they have a shorter storage life in their harvested state.

Wheat, rice and corn are produced in the largest quantities compared to all other grains worldwide. Barley, rye, oats, triticale, millet, etc. are produced in substantial but lesser quantities. Of all of the grains grown for human consumption, only whole grain rice is routinely cooked by the consumer due to whole grain rice's relatively short cooking time of 15 to 20 minutes compared to the much longer cooking times for other whole cereal grains. Subsequently, cereal grains are ground into flours for consumption in the form of baked goods, soups, porridge, pastas, etc.

Bulgur is a boiled wheat product that is traditionally consumed in the Middle East. Bulgur is produced by boiling wheat for a minimum of 45 to 60 minutes. The boiled wheat is then dried for storage. The consumer rehydrates bulgur by boiling the product for 15 minutes and then steaming the product for an additional 15 minutes.

There are substantial food shortages throughout the world, particularly in India and the Far East. An obvious remedy for this shortage would be to export wheat from countries having a surplus to the areas where a shortage exists. However, these food-deficient areas also have deficiencies in fuels. Consequently, wheat and other grains which must be cooked for long periods of time to bring them to an edible state cannot be used satisfactorily since an inordinate amount of fuel must be consumed to prepare them.

Grain production has also been recently examined in terms of the importance of grain in increasing dietary fiber. It is well known that dietary fiber is an important component of the human diet, and that the American diet is deficient in fiber. Dietary fiber consists of insoluble and soluble fiber.

Insoluble fiber is indigestible by monogastric mammals, such as human beings. It binds a modest amount of water and is found in the hulls and bran layers of cereal, waxy hull-less barleys, and vegetable stems. The consumption of insoluble fiber has been correlated with reduced incidence of colon cancer, hemorrhoids, and other maladies.

Soluble fiber differs from insoluble fiber in that it binds large amounts of water to form thick solids and gels. Soluble fiber is an important component of edible fruits (pectin), cereal grains such as waxy hull-less barley, oats (beta-glucan), and psyllium. Other source of soluble fiber include hydrocolloids such as carrageenan and alginates found in seaweed, xanthan prepared by fermentation of microorganisms, and some seeds, such as guar. Numerous diet studies have shown that soluble fiber provides satiety (reduces food consumption), reduces blood cholesterol, and reduces the rate of intestinal absorption of glucose.

There have been various efforts to remedy the long-term cooking requirements of raw grains, including pre-cooking the grains. Generally, these precooking procedures involve heating and wheat in boiling water or in steam under atmospheric or superatmospheric pressure. However, there are various problems involved with these techniques. For instance, it is difficult to uniformly cook grains in this manner and, thus, some of the treated grains retain hard, uncooked centers. Also, the treatments can lead to rupturing of the grains or cause the individual grains to become mushy.

One method for decreasing the cooking time for bulgur is to crack the wheat, then parboil and dry it. For instance, U.S. Pat. No. 2,930,697 issued to Miller relates to a method of processing wheat wherein the bran coat of the wheat is compressed to crack it open and expose the starch mass of the grain. However, considerable nutrients are lost from the grain during the cracking and cooking process.

Another method for shortening the cooking time of grains is to chemically treat the grains. One such method is described in U.S. Pat. No. 3,190,754 issued to Mathews wherein wheat is treated with alkaline agents, such as sodium hydroxide (lye) and ammonia, then further treated with a dilute acidic agent and dried. However, these chemicals are caustic to work with and, since the chemicals penetrate the grain, can give the grain an undesirable flavor or, in some instances, may even be harmful to the consumer.

U.S. Pat. No. 5,464,647 issued to Messick describes a method of manufacturing a quick cooking barley product. Even after this processing, however, the Messick barley product still requires at least five minutes to rehydrate the product, followed by a standing time of at least five minutes. Further, Messick does not contemplate the processing of other grains other than barley, or a mixture of grains.

There is therefore a need in the art for a method of processing grains to decrease their cooking time while retaining the nutrients and flavor of the grain. There is also a need in the art for a method of processing multiple whole grains.

The present invention has as its primary object the production of whole grain, quick cooking blends which may be rehydrated and/or cooked in a few minutes, providing a whole grain food which may be consumed as-is, or may be incorporated into other food products when whole grain identity is desired.

A further object of the present invention is the production of a grain product which retains a majority of its original nutrients.

A further object of the present invention is the production of a grain product which utilizes only water, grain and heat as its inputs, thereby eliminating the introduction of potentially harmful chemicals or chemical reactions within the product.

A further object of the present invention is the production of a grain product which has been cooked and frozen and may be consumed in its hydrated state after thawing and/or heating.

A further object of the present invention is the production of a grain product which has been cooked and dried that may be consumed in its dry state as a snack or a dry cereal.

A further object of the present invention is the production of a cooked and dried grain product which may be cut, milled, or ground into meal, flakes, granules, or powder for use in other products.

A further object of the present invention is the production of a grain product which is uniform in consistency.

Yet a further object of the present invention is the production of grain products comprised of compressed multiple whole grains which provide superior nutritional and functional properties.

Still a further object of the present invention is the production of a grain product comprised of waxy hull-less barley having large amounts of dietary fiber.

These and other objects of the present invention will become clear from the following detailed description of the invention.

SUMMARY OF INVENTION

The present invention relates to a novel processing method for grains and multi-grain mixtures. The process of the invention first includes the step of cooking grains to achieve a moisture content of from 40–80%. The grains are cooked in water preheated to a temperature of from about 80° C. to about 150° C. For soft grains, this cooking step is conducted for about 5–45 minutes and for hard grains this step is conducted for about 5–90 minutes. The ratio of grain to water is from about 1:2 to about 1:10, with a preferred ratio of about 1:4. The cooked grain product is then rinsed with cool water to halt the cooking process and to remove excess starch. The grains are then either dried or optionally flash frozen at a temperature of from about −18° C. to −30° C. to form a free-flowing grain product.

The resulting grain product may be thawed or rehydrated using conventional methods, utilized as a ready-to-eat snack or cereal, or further processed for use as an ingredient in other food products. The individual grain components in the product retain their flavor, color, and nutrients during the treatment process.

The present invention especially relates to a novel processing method for waxy hull-less barley. The waxy hull-less barley is first hydrated to a moisture content of between about 50–75% in water preheated to a temperature of from about 75° C. to about 150° C. This cooking step is conducted for a time period of between about 15–120 minutes, with about 50–65 minutes being preferred. The cooked barley is then rapidly cooled to a temperature of less than about 60° C. to halt the cooking process. Following the cooling step, the cooked barley is dried to a moisture level of between about 6–12 percent.

The resulting grain products of this invention may be thawed or rehydrated using conventional methods, utilized as a ready-to-eat snack or cereal, or further processed for use as an ingredient in other food products. The individual grain components in the product retain their flavor, color, and nutrients during the treatment process.

The present invention further relates to the manufacture of food products derived from the resulting grain product. The food products include whole grain or milled grain fractions for structure in combination with a very fine milled grain fraction which serves as a binder to provide superior nutritional and functional properties.

DETAILED DESCRIPTION OF THE PREFERRED EMBODIMENT

The present invention describes a novel method of processing grains which can be performed on nearly all types and classes of grains, including wheat (all varieties), durum wheat, conventional barley (all varieties), waxy barley (all varieties), oats, rye, triticale, rice (all varieties), corn, buckwheat, millet, amaranth, quinoa, spelt, kamut, durum, flax, wild rice, and sorghum. The whole grains are first cleaned and sized according to standard procedures. Foreign matter, shriveled and broken grains are discarded. The whole grains are then weighed and blended as per specific formulas which yield the desired flavor, texture, and appearance characteristics. Since the cooking times for soft grains, such as once pearled barley, brown rice, and whole oat groats, are shorter than that of hard grains, such as black barley, wheat, rye, and triticale, the grains can be divided for staggered timed processing.

The grains are first cooked to fully hydrate the grains and to gelatinize the starches within the grains. It is preferred, but not required, that the starches are cooked until they are fully gelatinized. The whole grains are heated in water at a ratio of from 2:1 to 10:1 water to grain by weight. The preferred ratio of water to grain is from 3:1 to 5:1 and the most preferred ratio is about 4:1 water to grain. Ratios of grain to water higher than 1:4 are less preferred due to increased levels of starch in the water during processing which, while not affecting the quality of the final product, complicate the cooling and rinsing step. The water temperature for the cooking step can range from about 80° C. to about 150° C., with a preferred temperature of about 88–122° C. and a most preferred temperature of about 90–105° C. The water is heated to the requisite temperature prior to adding the grain.

The grains are cooked under a pressure of one to three atmospheres until the moisture content of the grain is from 40–80%. The cooking time to achieve this moisture level is from 5 to 90 minutes, depending on the type of grains being cooked and the temperature of the cooking water. For instance, if the grains are soft, the cooking time will be from 5–45 minutes with a preferred time of 15–35 minutes and a most preferred time of about 25 minutes. The resulting moisture content of the soft grains will be from 40–80%. Soft grains include but are not limited to pearled barley, brown rice, and whole oat groats.

If the grains are hard, the cooking time will be longer due to the intrinsic hardness and particular composition of the grains. The cooking time for hard grains will range from 5–90 minutes with a preferred time of 60–70 minutes and a most preferred time of about 65 minutes. The resulting moisture content of the hard grains will be from 60–80%. Hard grains include but are not limited to triticale, rye, and wheat. The cooking time of black barley falls somewhere in between the cooking times for soft and hard grains and can range from 45–65 minutes.

If a mixture of soft and hard grains is desired, the hard grains can be cooked for a predetermined length of time and the soft grains added later so that all of the grains finish cooking at the same time. For example, once the hard grains have cooked for about 40 minutes, the soft grains can be added and the entire mixture cooked together for an additional 25 minutes. Overall, the cooking of the whole grain product ranges in conditions from single atmospheric aqueous cooking at 80° C. for 90 minutes to high pressure up to 3 atmospheres cooking up to 150° C. for 5 minutes.

Thus, the invention allows for preblended subsets of whole grain blends to be processed together in a single cooking vessel. Hard composition grain blends may be cooked for longer time periods than softer composition grain blends.

The processing method of this invention has the advantage of not requiring the use of chemicals or additives as described in U.S. Pat. No. 3,190,754 issued to Mathews wherein wheat is treated with alkaline agents, such as sodium hydroxide (lye) and ammonia, then further treated with a dilute acidic agent. Instead, Applicant's processing method cooks the grains to the desired texture without the need for such caustic chemicals. "Substantially free of chemicals" is herein defined as meaning that Applicant's processing method is operative in the absence of a caustic amount of chemicals.

Once the whole grain blend is cooked, it is then rinsed with water having a temperature of less than 20° C. (room temperature). Sufficient rinsing should occur so that excess starch is removed from the cooked whole grains and the internal temperature of the cooked whole grains is reduced to less than 60° C.

The rinsed and cooked whole grain blend is drained of excess water. The drained whole grain blend becomes free flowing when excess water is removed.

The free flowing, preferably completely gelatinized (fully cooked), whole grains are then either dried or flash frozen. If the grains are dried, they should be dried until the moisture level of the dried grains is 12% or less by weight. A convenient means of doing this is through the use of a high air velocity drier. The air inlet temperature of the drier is between 135° C. and 235° C., with a preferred temperature of between 185° C. and 205° C., and the outlet temperature of the drier is between 70° C. and 120° C., with a preferred temperature of between 90° C. and 100° C. The drying time is between 5 and 20 minutes, depending on the temperature of the air, i.e. hotter air drying temperatures will require less time drying. Other standard means for drying the grains can also be used, so long as the requisite moisture level is attained.

In the alternative, the grains can be flash frozen and stored at a temperature of between −18° C. to −30° C., with a preferred temperature of about −24° C. This step can be performed merely by placing the packaged grain in a storage area having this temperature or can be performed using carbon dioxide, nitrogen immersion, or blast freezing. The final, completely gelatinized, grain product is free flowing and has a moisture content of from 40–80%.

The frozen grain product can be thawed by conventional means. If heated in a microwave, the product need only be heated for about 1–7 minutes, with 1–3 minutes usually being sufficient. The thawed product may then be consumed directly or used in various other ways by the consumer.

The gelatinized, dried grain product may be prepared for direct consumption by heating in water or milk. The dried grain product should be heated for about 1–7 minutes.

Further, the gelatinized dried grain product can also be milled or further processed and added as an ingredient to other food products. The milled grain products may be rehydrated by adding half to two and one-half parts water to one part grain and allowing the grain to absorb the water. The rehydration process may be expedited by placing the grain/water mixture in the microwave for up to 4 minutes or otherwise heating in water. Usually, about 2 minutes is sufficient, depending on the type of microwave. Since different grains mill differently depending upon the degree of gelatinization and moisture level in the grain at the time of milling, this rehydration time will vary somewhat. For instance, if the very finely milled grain particles will be instantly rehydrated upon the addition of water.

Further, the finer milled fragments will rehydrate instantly by just adding water, milk or other liquid of the consumer's choice. This product may be consumed as a breakfast cereal or included in various beverages as a convenient means for consumers to add fiber to their diets. For instance, the product may be added to malts, shakes, milk, water, fruit juices, soda, and other beverages.

The present invention especially relates to the processing of waxy hull-less barley. Waxy hull-less barley is a preferred grain for use in this invention due to its high percentage of dietary fiber. Further, waxy hull-less barley is remarkably free of the "sliminess" that normally accompanies other high soluble fiber foods, such as oats. In addition, waxy hull-less barley has a bland taste, and is therefore suited for inclusion in many types of foods, including hot and cold cereal, ground beef, dough-based bakery products, and high fiber drinks. It is also suitable for consumption by itself, for instance, as a replacement for rice, potato, and/or pasta in side dishes. In addition to providing increased nutritional value to foods, waxy hull-less barley also provides improved texture.

In accordance with the methods described above, waxy hull-less barley is first hydrated to a moisture level of between about 57–65% by cooking the barley in water having a temperature of between about 75–150° C. so that the starch is substantially gelatinized. The preferred cooking temperature is between about 75–100° C., with a preferred hydration level of between about 57–63%. Typical hydration times are between about 15–120 minutes, with about 50–65 minutes being preferred. In general, the ratio of water to waxy hull-less barley during the hydration step ranges from about 2:1 to about 10:1. Prior to hydration, the waxy hull-less barley kernel is preferably cracked into coarse pieces in order to increase the surface area of barley exposed to the water.

Following the hydration step, the cooked waxy hull-less barley is rapidly cooled to an internal temperature of less than 60° C. in order to halt the cooking process. The cooling step is preferably performed in less than about five minutes.

The waxy hull-less barley is next dried or flash-frozen as described above to a moisture level of less than about 14% by weight, with about 6–12% moisture level being preferred. The drying process may be performed using conventional methods, such as air-drying, spray drying, etc. The barley is preferably dried at a temperature ranging between about 150–225° C., with about 190–215° C. being preferred, and about 190–205° C. being most preferred.

In a most preferred drying process, the barley is dried/toasted in two stages which improves the taste and flavor of the barley: first at a temperature range of about 150–175° C. for 3–5 minutes, then for 2–4 minutes at 190–225° C. Further, it is preferred that the barley kernels are dried in a manner such that the kernels are rendered slightly porous to rehydrate more quickly. This can be accomplished by drying the kernels individually, in small clumps, or as a substantial monolayer or by suspending the kernels with moving dry air.

These processes are all effective in forming small voids and/or crevices in the kernels which provide greater surface area for the water to contact the kernels and rehydrate them more quickly.

The waxy hull-less barley product made in accordance with this invention may be rehydrated and prepared for consumption in the manner already outlined above. It may be incorporated into the various foods described above or served alone, with or without additives such as salts, sweeteners, flavorings, colorings, nutrients, agglomerating agents, surfactants (food emulsifiers), minerals, and/or combinations thereof.

Many individuals, senior citizens especially, require extra fiber in their diet to maintain digestive health. Typical means of obtaining this extra fiber was to consume psyllium products, such as Metamucil®, or other high fiber foods. These products are typically not very palatable, however. Applicant's invention allows consumers to receive their daily fiber requirement from a more palatable source, and used in a variety of ways and foods.

As shown, the frozen grain product or dried milled grain product of this invention is ready for consumption in a substantially shorter amount of time than conventional processed grains. For instance, Messick (U.S. Pat. No. 5,464,467) requires his processed grains to be cooked for at least five minutes and to stand at least another five minutes prior to consumption, for a total preparation time of at least ten minutes. In contrast, Applicant's invention requires no standing time, and is ready for direct consumption by the consumer with seven minutes or less of preparation time, with the milled grain product being ready in four minutes or less.

The dried grain product can then be milled or further processed and added as an ingredient to other food products if desired. The grains may be further processed by any of the methods including, but not limited to, sizing, cooking, drying, milling, screening, blending, by-product extended milling, and recombinant blending of granulated sizes of various grains.

In a preferred embodiment, the grain product is milled, then sieved to produce milled grain of various particle sizes. Whole grains are crushed in a mill to produce cut grain fragments and fines. The grain fragments and fines are separated by employing sieves having 12 openings per linear inch (U.S. Standard No. 12) and greater, but less than 100 openings per linear inch (U.S. Standard No. 100). Milled fragments that do not pass through the selected sieve comprise the coarse fraction, with the smaller fragments and fines that will pass through the sieve comprising the fine fraction. The fine fraction preferably comprises grain fragments that will pass through a sieve having 16 openings per linear inch, but not a sieve having greater than 26 openings per linear inch.

The fine fraction is next preferably passed through conventional roller mills and/or ball mills to further decrease the particle size of the grains. Particles that pass through a sieve having $\geq 100$ openings per linear inch comprise the very fine fraction. The very fine fraction is preferably capable of passing through a sieve having $\geq 200$ openings per linear inch.

The present inventor has now discovered that new food products can be manufactured using the very fine fraction in combination with whole grains, coarse fraction, and/or fine fraction of grains. The very fine fraction serves as a binder in the food product, while the larger fractions provide structure. Thus, the food product can essentially bind itself, without the need for additional binders, such as gums and other binders typically used in the food industry. The milling procedure exposes the starchy components of the grain that are sticky and provide adhering properties to the product. Small amounts of water may be included in the grain product to provide increased adherency.

Two types of dietary fiber, soluble and insoluble, are necessary in correct nutrition. The particle size of insoluble fiber also plays an important role in nutrition. The smaller the particle size, the greater the surface area and exposure of the fiber to components in the digestive tract and, thus, the greater the ability of the fiber to bind cholesterol and other undesirable chemical and biological products. In comparison, fiber having a larger particle size provides more of a cleansing action to assist in the control and prevention of diverticulitis and other diseases of the digestive tract.

Some types of grains having more insoluble fiber, while others have a higher level of soluble fiber. Certain types of grain have a greater amount of beta-glucan soluble fiber to assist in cholesterol reduction, benefit the immune system, and provide other digestive benefits. To date, there has been no cereal grain product on the market that includes a blend of different types of grains of small and large particle sizes that is available in a convenient form for the consumer. Currently available cereal grain products are highly refined, and therefore lose a substantial amount of their dietary fiber and overall nutritional value. In using a blend of different types of grains of different particle sizes, Applicant provides a product which is nutritionally beneficial in all of these respects.

In manufacturing food and beverage products with this invention, different combination of grains may be used according to the type of product being made and the individual needs of the consumer. For example, the product may be manufactured to exclude certain grains that consumers may be allergic to, or formulated to include grains that add particular flavors, textures, and/or nutrients to the product.

As set forth above, the food products of this invention include one or more components of whole grain, coarse fraction, and/or fine fraction in combination with the very fine fraction. The very fine fraction should constitute at least 0.05% by weight of the food product to provide sufficient binding of the ingredients therein. From about 1% to 25% by weight very fine fraction is preferred. The grains used in the food product may be of the same type or a mixture of various types of grain.

In certain types of products manufactured in accordance with this invention, such as yogurt, milk, malts, nutritional supplements (i.e. Ensure®), higher concentrations of very fine fraction is preferred. In contrast, in such products as cereals and granola bars a lower percent of fine fraction would be preferred.

Various types of food products may be manufactured using Applicant's processed grain. These products include but are not limited to pilafs, toppings, bars, wafers, beverages, cookies, snacks, breakfast cereals, and meatless burgers. The grain component may constitute up to 100% of the food or drink product. The products may also include up to 50% by weight of supplemental ingredients which will vary greatly depending upon the type of food or drink product, and individual tastes of the consumer. These supplemental ingredients are added to Applicant's grain food or drink product in amounts typically included in other such products in the market, and include flavorings, coloring agents, texturizing agents, fillers, vitamins, minerals, carbohydrates, and other agents to increase the nutritional value of the food or drink.

Pilafs are used as side dish in the U.S. and as a staple in Middle Eastern countries and generally consist of free flowing individual grains or pieces of grains. Pilafs can be made from thawed, frozen whole kernel grains or rehydrated, dried whole kernel grains. Further, pilafs can also be made from dried, milled grain that does not pass through a sieve having from 12 to 20 openings per linear inch in combination with very fine milled grain for binding purposes. The very fine milled grain has a particle size such that it is capable of passing through a sieve having at least 100 openings per linear inch, and preferably 200 openings per linear inch or less. Pilafs may be enhanced with supplemental ingredients that contribute flavor, color, nutrition, texture, and eye appeal. These ingredients may comprise from about 1% to 25% by weight of the pilaf.

Toppings are used to enhance the flavor, texture, and appearance of foods ranging from salads, to pastas, to ice cream. Their flavor ranges from sweet to savory depending upon the type of supplemental ingredients included. Toppings can be made from dried, milled grain that does not pass through a sieve having from 12 to 20 openings per linear inch in combination with very fine milled grain for binding purposes. The very fine milled grain has a particle size such that it is capable of passing through a sieve having at least 100 openings per linear inch, and preferably 200 openings per linear inch or less. Toppings may be enhanced with other components that contribute flavor, color, nutrition, texture, and eye appeal, which may comprise from about 1% to 25% by weight of the toppings.

Bars are a convenient means for providing energy and/or nutrient-dense foods. Bars are the ideal handheld food. They are further shelf-stable, easy to store and carry, and appealing to persons of all ages. Bars can be made from a combination of particle sizes ranging from whole kernel grains to particles small enough to pass through a U.S. No. 200 sieve. Bars are preferably made from dried, milled grain that does not pass through a sieve having from 12 to 20 openings per linear inch in combination with very fine milled grain for binding purposes. The very fine milled grain has a particle size such that it is capable of passing through a sieve having at least 100 openings per linear inch, and preferably 200 openings per linear inch or less. Bars may be enhanced with supplemental ingredients that contribute agglomeration, flavor, color, nutrition, texture, and eye appeal, which may comprise up to 50% by weight of the bars.

Cookies are another convenient, popular food, similar to bars, and generally consist of grain products that carry flavor or texture-contributing components. Cookies can be made with grains having a particle size ranging from whole kernel to as small as particles that will pass through a U.S. No. 200 sieve. Cookies can also be made from dried, milled grain that does not pass through a sieve having from 12 to 20 openings per linear inch in combination with very fine milled grain for binding purposes. The very fine milled grain has a particle size such that is capable of passing through a sieve having at least 100 openings per linear inch, and preferably 200 openings per linear inch or less. Cookies may be enhanced with supplemental ingredients that contribute agglomeration, flavor, color nutrition, texture, and eye appeal, which may comprise up to 50% by weight of the cookies.

Snacks range in flavor from sweet, to savory, to salty. Snacks may be configured in a wide variety of shapes and provide between-meal calories and nutrition. Snacks can be made with grains having a particle size ranging from whole kernel to as small as particles that will pass through a U.S. No. 200 sieve. Snacks can also be made from dried, milled grain that does not pass through a sieve having from 12 to 20 openings per linear inch in combination with very fine milled grain for binding purposes. The very fine milled grain has a particle size such that is capable of passing through a sieve having at least 100 openings per linear inch, and preferably 200 openings per linear inch or less. Snacks may be enhanced with supplemental ingredients that contribute agglomeration, flavor, color, nutrition, texture, and eye appeal, which may comprise up to 30% by weight of the snacks.

Wafers are hard, cookie-like convenience foods which are similar to snacks in ingredients and flavors. Wafers may be made from dried, milled grain that passes through a sieve having from about 12 to 200 openings or less per linear inch.

Breakfast cereals provide a convenient means of receiving carbohydrates. Cereals may be consumed hot or cold. Cereals can be made from whole kernel grains to dried, milled grain having a particle size that passes through a sieve having from about 12 to 100 openings per linear inch. Cereals may be enhanced with supplemental ingredients that contribute agglomeration, flavor, color, nutrition, texture, and eye appeal, which may comprise from about 1% to about 25% by weight of the cereal.

Meatless burgers provide the texture, mouth feel, and flavor of meat products without the saturated fat and cholesterol associated with meat products. Meatless burgers are most preferably prepared using the finely milled grain of the present invention. Meatless burgers can be made from dried, milled grain that does not pass through a sieve having from 12 to 20 openings per linear inch in combination with very fine milled grain for binding purposes. The very fine milled grain has a particle size such that it is capable of passing through a sieve having at least 100 openings per linear inch, and preferably 200 openings per linear inch or less. Meatless burgers may be enhanced with supplemental ingredients that contribute agglomeration, flavor, color, nutrition, texture, and eye appeal, which may comprise from about 1% to 25% by weight of the burgers.

Drink products, such as malts, shakes, milk, soda, fruit juices, and other grain-enhanced beverages can be made from dried, milled grain that passes through a sieve having from about 20 to 150 openings per linear inch.

Instant breakfast products can be made from dried, milled grain that passes through a sieve having from about 12 to 200 openings per linear inch. Instant breakfast products are most preferably made from dried, milled grain that passes through a sieve having from 21 to 150 openings per linear inch.

Due to the binding effect of the hydrated, cooked, milled and/or whole grains, the bonded grain fractions can be shaped and formed into a wide variety of food products. These grain and/or multi-grain food products are a convenient, healthy, alternative for consumers to receive their daily requirement of fiber, vitamin and mineral nutrition.

The grain product of the present invention offers several advantages over other grain products. First, the grain product can be rehydrated quickly, compared to raw, hard grains which can normally take up to 180 minutes to cook before reaching the desired consistency. The consistency of the product is uniform, without hard uncooked centers or mushiness. The product can be consumed as-is for snacking and dry cereals or rehydrated quickly. Moreover, the grain product may be cut, milled, or ground into meal, flakes, granules, or powder for use in other products. These products may not require the addition of binders since the very fine grain fraction serves this function.

The grains have a uniform consistency without hard, uncooked centers or mushiness. In addition, the grains retain their nutritious value, taste, and flavor during the treatment process. Further, since the production of the grain product utilizes only water, grain and heat as its inputs, it eliminates the introduction of potentially harmful chemicals or chemical reactions within the product.

The following examples are provided for illustrative purposes only are not intended to limit the present invention in any manner.

EXAMPLE 1

Processing of Soft Grains—Once Pearled Barley, Brown Rice, and Whole Oat Groats

Materials

APV Dual Ribbon Blender Model 15 DR, 3 hp motors on each ribbon, and a nominal capacity of 15 cu. ft. (790 pounds). The ribbons had been replaced with paddle agitators (optional equipment). The agitators were turning in opposite directions, directing the product motion up the sides of the blender and into the center. The rpm of the agitators was 23 and 17 rpm (the revolution speed of the agitators does not appear to be critical). This blender is steam jacketed to allow for heating.

Procedure

Using a grain to water ratio of 1:4, 36 gallons of water was added to the blender and heated to 93° C. Twenty-five pounds each of barley, brown rice, and oat groats are added to the blender (with the agitator on). Samples were taken from the blender at 10, 15, 20, 25, and 30 minutes and evaluated for moisture content.

| Results | % Moisture |
| --- | --- |
| 10 minute sample - undercooked | 43% |
| 15 minute sample - undercooked | 53% |
| 20 minute sample - slightly undercooked | 57% |
| 25 minute sample - good | 61% |
| 30 minute sample - over cooked, visible starch in the fluid surrounding the grain | 66% |

This study demonstrates that once pearled barley, whole oats and brown rice are preferably processed for between 20 and 30 minutes, and ideally for about 25 minutes.

EXAMPLE 2

Processing of Hard Grains—Black Barley, Wheat, Rye, and Triticale

Materials

APV Dual Ribbon Blender Model 15 DR, 3 hp motors on each ribbon, and a nominal capacity of 15 cu. ft. (790 pounds). The ribbons had been replaced with paddle agitators (optional equipment). The agitators were turning in opposite directions, directing the product motion up the sides of the blender and into the center. The blender is steam jacketed to allow for heating.

Procedure

Using a grain to water ratio of 1:4, 48 gallons of water were added to the blender and heated to 93° C. Twenty-five pounds each of triticale, wheat, rye, and black barley were added to the blender with the agitator on. Samples were taken from the blender at 40, 45, 50, 55, 60, 65, and 70 minutes and evaluated.

| Results | % Moisture |
| --- | --- |
| 40 minutes - undercooked | 58.5% |
| 45 minutes - undercooked | 62% |
| 50 minutes - black barley close to done, other grains undercooked | 62% |
| 55 minutes - black barley done, other grains undercooked | 65% |
| 60 minutes - rye, triticale, and wheat close | 65% |
| 65 minutes - rye, triticale, and wheat are done | 67% |
| 70 minutes - overcooked, visible starch in the fluid surrounding the grain | 74% |

This study demonstrates that the black barley should be processed for 50–60 minutes and the rye, triticale, and wheat for 60–70 minutes. The optimum processing time for the black barley is about 55 minutes while the optimum processing time for the hard grains is about 65 minutes.

EXAMPLE 3

Multi-Grain Hydration Procedures

Water is added to the blender as set forth above in an amount of four times the amount of grain to be added, by weight. The water is then heated to about 93° C. Triticale, rye, and wheat are added to the water and cooked for 10 minutes. The black barley is then added and the grain mixture is cooked for an additional 30 minutes (40 minutes total). The pearled barley, brown rice, and whole oat groats are then added. The mixture is cooked for an additional 25 minutes (65 minutes total). The grains are then cooled and stored in a freezer at −30° C.

EXAMPLE 4

Cooling Process

The grains were processed in accordance with Example 3 using 30 pounds each of the seven grains (210 pounds dry weight total) and 100 gallons of water.

The process initially started with 20 psi steam pressure on the blender jacket to heat the water to about 98° C. The steam pressure was then reduced to 10 psi on the blender jacket and the triticale, rye, and wheat were added, causing the water temperature to drop to 95° C.

After the 65 minute cooking process, the grains were cooled to stop the cooking process by emptying about ½ of the blender contents into a portable tank containing about 75 gallons of cool water (about 13° C.). Also, cool water was added to the product remaining in the blender. Grain temperatures were 56° C. in the portable tank and 52° C. in the blender.

This study quickly reduced the temperature of the grains to less than 60° C. to halt the cooking process.

EXAMPLE 5

Grain Hydration Procedure

The seven grain mixture was hydrating according to Example 3 using 30 pounds of each of the seven grains and 100 gallons of water.

20 psi steam pressure was placed on the blender jacket and the water was heated to 97° C. The steam pressure was reduced to 10 psi on the blender jacket and the triticale, rye, and wheat were added (water temperature dropped to 93° C.).

After the 65 minute process, the grains were cooled to stop the cooking process by emptying about ½ of the blender contents into a portable tank containing about 75 gallons of cool water (13° C.). Also, cool water was added to the product remaining in the blender. The grain temperatures were 56° C. in the portable tank and 53° C. in the blender.

EXAMPLE 6

Grain Hydration Procedure

The grains were processed in accordance with Example 5, only the water was heated to 98° C. The steam pressure was reduced to 10 psi on the blender jacket and the triticale, rye, and wheat were added to the water (water temperature dropped to 94° C.).

The grain s were cooled in accordance with Example 5. The final grain temperatures were 56° C. in the portable tank and 51° C. in the blender.

EXAMPLE 7

Grain Hydration Procedure

The grains were processed in accordance with Example 5, except the water was heated to 93° C. Following reduction of the steam pressure to 10 psi on the blender jacket and adding the triticale, rye, and wheat, the water temperature dropped to to 91° C.

Following the same grain cooling procedure in Example 5, the grain temperatures were 59° C. in the portable tank and 52° C. in the blender.

EXAMPLE 8

Grain Hydration Procedure

The grains were processed in accordance with Example 5, except the water was heated to 96° C. Following reduction of the steam pressure to 10 psi on the blender jacket and adding the triticale, rye, and wheat, the water temperature dropped to 93° C.

Following the same grain cooling procedure in Example 5, the grain temperatures were 54° C. in the portable tank and 52° C. in the blender.

EXAMPLE 9

Grain to Water Ratio of 1:3

Materials

Same as in Example 2.

Procedure

Using a grain to water ration of 1:3, 36 gallons of water were added to the blender and heated to about 93° C. Twenty-one pounds each of triticale, wheat, rye, and black barley were added to the blender and cooked for 10 minutes. 9.6 pounds of black barley were then added and the mixture was cooked for 30 additional minutes (40 minutes total). 9.8 pounds of pearled barley, 10 pounds of brown rice, and 8.6 pounds of whole oat groats were added and the entire mixture was cooked for 25 additional minutes (65 minutes total). The grains were cooked and stored in a −30° C. freezer.

The study originally started with 20 psi steam pressure on the blender jacket to heat the water to 94° C. The steam pressure was then reduced to 10 psi on the blender jacket and the triticale, rye, and wheat were added (water temperature dropped to 91° C.).

After the 65 minute process the grains were cooled to stop the cooking process by emptying about ½ of the blender contents into a portable tank containing about 75 gallons of cool water (13° C.).

Results

At the end of the process the contents of the blender appeared "thick" with starch thickening of the water. After rinsing with cool water the visual appearance of the product was good. The disadvantage of using the 3:1 ratio of water to grain was that some of the starch that cooked out of the grain thickened, resulting in a starch-water slurry as thick as a fairly heavy syrup which coated the grain and somewhat retards the washing and cooling of the grain. This was not a problem with the four parts of water to one part grain. Thus, while the 3:1 ratio of water to grain creates an acceptable end product, and 4:1 ratio is preferred due to ease in the washing and cooling steps.

EXAMPLE 10

Nutrition Analysis of Grain Blends A, B, and C

Blend A comprises equal parts of hard red spring wheat, rye, triticale, black barley, pearled barley oat groats, and brown rice processed using the cooking method described in the Examples above. Blend A was dried to a moisture level of less than 12%.

Blend B comprises equal parts of hard red spring wheat, rye, triticale, black barley, pearled barley oat groats, and brown rice processed using the cooking and freezing method described in the Examples above.

Blend C comprises equal parts of hard red spring wheat, rye, triticale, black barley, pearled barley oat groats, and brown rice in an unprocessed, raw state.

|  | A | B | C |
|---|---|---|---|
| Calories/100 g (FBDG Subtracted) | 347 | 101 | 321 |
| Calories from fat/100 g | 35 | 10 | 32 |
| Fat, Acid Hydrolysis (%) | 3.90 | 1.10 | 3.50 |
| Carbohydrates, Available (%) | 64.1 | 18.7 | 59.5 |
| Carbohydrates, Total (%) | 74.3 | 21.9 | 70.2 |
| Fiber, Group (%) |  |  |  |
| Total Dietary Fiber | 13.0 | 4.1 | 13.1 |
| Insoluble Fiber | 10.2 | 3.2 | 10.7 |
| Soluble Fiber | 2.8 | 0.9 | 2.4 |
| Protein by Kjeldahl (F = 6.25) | 13.8 | 4.0 | 13.0 |
| Iron by AA (mg/100 g) | 3.34 | 1.14 | 3.16 |
| Vitamin B1 by Fluorometer (mg/100 g on a dry basis) | 0.0376 | 0.0329 | 0.0336 |
| Vitamin B2 (riboflavin) (mg/100 g on a dry basis) | 2.12 | 2.13 | 2.13 |
| Moisture by Forced Air (1 hr) (%) | 6.39 | 72.6 | 11.7 |
| Ash Analysis (%) | 1.587 | not determined | 1.648 |
| Niacin, Microbiological (mg/100 g) | 3.08 | not determined | 3.46 |

EXAMPLE 11

Preferred Grain Milling Procedure

Step 1

Dry processed grains are first milled using a roller mill equipped with LePage rolls. The roll size if preferable of a 6-inch diameter. The LePage corrugation per inch is 16, speed of rolls of parallel rolls is 378 RPM, with the speed of perpendicular rolls being 104 RPM. Grain moisture percent, roll size, corrugation type, RPM of rolls are all determinative of the texture and size plus shrink of the product milled.

Step 2

Grains milled in Step 1 are separated by using a sieving procedure employing a U.S. No. 12 through U.S. No. 26 sieve to produce a fine milled fraction.

Step 3

The fine milled fraction of Step 2 is further milled through the use of a smooth roller mill and ball mills. This procedure produces a very fine fraction that is sieved through the U.S. No. 100 sieve to a U.S. No. 200 sieve, producing a powder-like product that can be further used in the manufacture of food products.

This study demonstrates that the grain product of the instant invention retains its nutritious value during processing in accordance with the present invention. Conversion of the nutrition information to a dry moisture basis for each grain blend reveals similar nutrition profiles for each grain blend.

It can therefore be seen that the present invention accomplishes at least all of its stated objectives.

What is claimed is:

1. A process of preparing a waxy hull-less barley food product comprising:

cooking barley kernels in water at a ratio of from about 2:1 to 10:1 water to kernels by weight at a temperature of 80–150° C. for a time period of 5–90 minutes until the moisture content of the kernels is between about 50% to 75%;

rinsing the kernels in water having a temperature of less than 20° C. for a time period sufficient to reduce the temperature of the kernels to less than 60° C.; and drying the grains at a temperature of 190–225° C. for 5 to 20 minutes to form dried grains;

wherein the dried grains may be prepared for consumption in from about one to seven minutes.

2. A process according to claim 1 wherein the kernels are hydrated to a moisture level of between about 57–65% by weight.

3. A process according to claim 1 wherein the kernels are cracked into coarse pieces prior to the cooking step.

4. A process according to claim 4 wherein the barley is cooled to an internal temperature of less than about 60° C. in less than about five minutes.

5. A process according to claim 1 wherein the barley kernels are dried in a manner to render the kernels porous.

6. A process according to claim 1 wherein the barley kernels are dried to a moisture level of less than about 14% by weight.

7. A process according to claim 6 wherein the barley kernels are dried to a moisture level of between about 6–12% by weight.

8. A process according to claim 1 wherein the barley kernels are dried under conditions to develop voids and crevices in the kernels.

9. A process according to claim 8 wherein the barley kernels are dried by a method selected from the group consisting of substantially placing the kernels in a monolayer and suspending the kernels with moving air.

10. A process according to claim 1 wherein the barley kernels are dried at an air temperature ranging from about 190–215° C.

11. A process according to claim 1 wherein the barley kernels are dried at about 150–175° C. for about 3–5 minutes and then dried at about 190–225° C. for about 2–4 minutes.

12. A process of preparing a waxy hull-less barley food product comprising:

cooking barley kernels in water at a ratio of from about 2:1 to 10:1 water to kernels by weight at a temperature of 80–150° C. for a time period of 5–90 minutes until the moisture content of the kernels is between about 50% to 75%;

rinsing the kernels in water having a temperature of less than 20° C. for a time period sufficient to reduce the temperature of the kernels to less than 60° C.; and flash freezing the grains to form frozen grains;

wherein the frozen grains may be prepared for consumption in from about one to seven minutes.

* * * * *